(12) United States Patent
Kim et al.

(10) Patent No.: US 9,074,068 B2
(45) Date of Patent: Jul. 7, 2015

(54) BAR TYPE CLAY MEMBER FOR CRAFT

(75) Inventors: Hak-Jae Kim, Daejeon (KR); Han-Shin Jung, Daejeon (KR); Ji Eun Lee, Daejeon (KR)

(73) Assignee: DONG-A TEACHING MATERIALS CO., LTD., Daejeon (KR)

( * ) Notice: Subject to any disclaimer, the term of this patent is extended or adjusted under 35 U.S.C. 154(b) by 308 days.

(21) Appl. No.: 12/983,942

(22) Filed: Jan. 4, 2011

(65) Prior Publication Data

US 2011/0171470 A1   Jul. 14, 2011

(30) Foreign Application Priority Data

Jan. 11, 2010   (KR) ........................ 20-2010-0000215

(51) Int. Cl.
| | |
|---|---|
| C08L 91/06 | (2006.01) |
| D03D 13/00 | (2006.01) |
| D02G 3/00 | (2006.01) |
| C08K 3/34 | (2006.01) |

(52) U.S. Cl.
CPC ............... *C08K 3/34* (2013.01); *Y10T 428/298* (2015.01)

(58) Field of Classification Search
CPC combination set(s) only.
See application file for complete search history.

(56) References Cited

U.S. PATENT DOCUMENTS

| | | | | |
|---|---|---|---|---|
| 2,348,039 | A | * | 5/1944 | Ulrich et al. ..................... 442/83 |
| 3,594,209 | A | * | 7/1971 | Kosche et al. ........... 428/488.11 |
| 6,485,556 | B1 | | 11/2002 | DeLuca |
| 2003/0131758 | A1 | * | 7/2003 | Breindl et al. ................. 106/271 |
| 2007/0240605 | A1 | * | 10/2007 | Iyer et al. ..................... 106/31.6 |

FOREIGN PATENT DOCUMENTS

| | | |
|---|---|---|
| KR | 10-2003-0082778 | 10/2003 |
| RU | 2103289 | 1/1998 |
| RU | 2252946 | 5/2005 |
| SU | 773055 | 10/1980 |

* cited by examiner

*Primary Examiner* — Bijay Saha
(74) *Attorney, Agent, or Firm* — Lexyoume IP Meister, PLLC

(57) ABSTRACT

A bar type clay member for craft includes a body formed by heating and melting 50 wt % to 80 wt % of wax, adding 10 wt % to 40 wt % of body pigment and 1 wt % to 10 wt % of a colorant to the melted wax, and then melting and dispersing the body pigment and colorant in the wax, wherein the body has a thickness ranging from 0.3 mm to 10 mm and has a bar-like shape.

3 Claims, 3 Drawing Sheets

BAR TYPE CLAY MEMBER FOR CRAFT

CROSS-REFERENCE TO RELATED APPLICATION

This application claims priority to and the benefit of Korean Patent Application No. 20-2010-0000215 filed in the Korean Intellectual Property Office on Jan. 11, 2010, the entire contents of which are incorporated herein by reference.

BACKGROUND OF THE INVENTION (a) Field of the Invention

The present invention relates to a bar type clay member for craft and, more particularly, to a bar type clay member for craft which is formed to have a bar-like shape so as to be easily and conveniently used in crafting and has excellent strength and shape consistency (or shape retainability) within a certain length and thickness.

(b) Description of the Related Art

In general, clay crafting or working is carried out to create various objects by using clay in houses, schools, institutes, kindergartens, and the like, in order to arouse children's or student's interest and develop creativity Clay used in the crafting operation may be real clay; however, because real clay is hard to be purchased or supplied and has a limitation in expressing various forms, shapes, or colors, so, in general, clay for craft (or artificial clay) manufactured in factories and sold is largely used.

For example, the conventional clay for craft is mixed with a plasticizer, a thickener, a coloring matter (or pigment), water, and the like, and manufactured to have a shape advantageous for distribution, packaging, and handling, and then distributed on the market.

Meanwhile, one of shapes of clay occasionally or frequently created in clay working is a bar-like shape, and the conventional clay for craft is short of retainability, causing a problem that the shape of created clay can be hardly retained and it is difficult to create several pieces of uniform bar type clay.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a bar type clay member for craft which is made from wax, body pigment, and a colorant (or a coloring agent) and formed to have a bar-like shape with a certain length and thickness so as to be easily and conveniently used in crafting, has excellent strength to provide an excellent shape retainability (or shape consistency) without using a skeleton or a stiffener, and can be softened by using a body temperature and then hardened at room temperature so as to be repeatedly used again.

An exemplary embodiment of the present invention provides a bar type clay member for craft including a body formed by heating and melting wax, adding body pigment and a colorant to the melted wax, and then melting and dispersing the body pigment and the colorant in the wax, wherein the body has a bar-like shape.

The body may be formed to have a sectional shape such as a circular shape, an oval shape, a polygonal shape, and the like.

The thickness of the body (which refers to the diameter in case of the circular body, the length of a longer axis in case of the oval body, and the diameter of a circumscribed circle in case of the polygonal body) may range from 0.3 mm to 10 mm.

The body may be wound in a spiral shape so as to be provided.

When the body is wound in a spiral shape and thusly provided, the body may be wound in various spiral shapes such as a cylindrical shape, a plate shape, a twisted shape, and the like, so as to be provided.

One of microwax, beeswax, and Japan wax may be used as the wax or two more of them may be mixed to be used, and a usage amount of the wax may range from 50 wt % to 80 wt %.

One of calcium carbonate, kaolin clay, talc, and magnesium carbonate may be used as the body pigment, or two or more of them may be mixed to be used, and a usage amount of the body pigment may range from 10 wt % to 40 wt %.

One of organic pigment, inorganic pigment, fluorescence pigment, metal pigment, pearl pigment, and phosphorescent pigment may be used as the colorant, or two or more of them may be mixed to be used, and a usage amount of the colorant may range from 1 wt % to 10 wt %.

According to an embodiment of the present invention, because a clay composition is fabricated by using wax, body pigment, and a colorant, and the bar type clay member for craft has a bar type body with excellent strength and shape retainability by using the clay composition. Thus, the bar type clay member for craft is very useful in clay working, can be effectively used to obtain various expressions, and is able to maintain excellent strength and shape consistency (or shape retainability) without using a skeleton or a stiffener.

Also, according to an embodiment of the present invention, because the bar type clay member for craft can be softened by a body temperature, it can become soft and flexible as the user touches it, allows for easy and convenient crafting to obtain a shape requiring flexibility, such as a character shape, a number shape, a twisted shape, a coil shape, and the like, and because it can be hardened at room temperature, it can be repeatedly used again.

In addition, according to an embodiment of the present invention, because the bar type clay member for craft can be wound in a spiral form so as to be provided, handling of the bar type clay member for craft, such as transportation, packaging, or the like, is facilitated, and also, the bar type clay member for craft can be unwound by a required amount so as to be conveniently used.

DETAILED DESCRIPTION OF THE EMBODIMENTS

A bar type clay member for craft according to an exemplary embodiment of the present invention will now be described.

Figure 1:
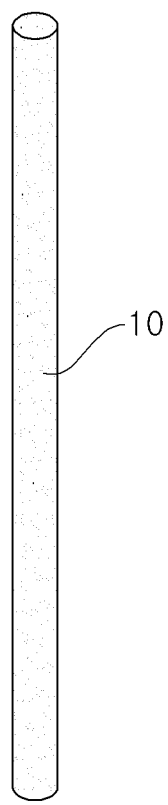
FIG. 1 is a perspective view of a bar type clay member for craft according to an exemplary embodiment of the present invention.
Figure 2:
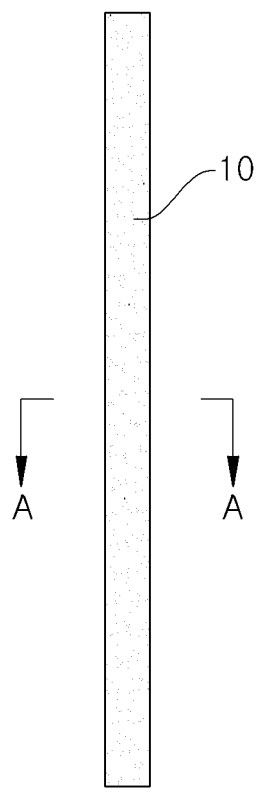
FIG. 2 is a front view of the bar type clay member for craft according to an exemplary embodiment of the present invention.
Figure 3:
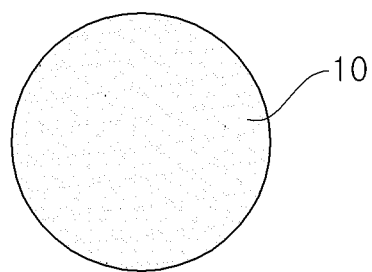
FIG. 3 is an enlarged cross-sectional view taken along line A-A in FIG. 2.

First, as shown in FIGS. 1 to 3, a bar type clay member for craft according to an exemplary embodiment of the present invention includes a body 10 formed by heating and melting wax, adding body pigment and a colorant to the melted wax, and then melting and dispersing the body pigment and the colorant in the wax, and in this case, the body has a bar-like shape.

As the wax, 50 wt % to 80 wt % of microwax is used to be heated and melted at approximately 85° C.

Instead of the microwax, beeswax or Japan wax may be also used, or two or more of the microwax, beeswax and wax may be mixed to be used.

As the body pigment, 10 wt % to 40 wt % of calcium carbonate is used.

As the body pigment, kaolin clay, talc, or magnesium carbonate, instead of calcium carbonate, may be used, or two or more of calcium carbonate, kaolin clay, talc, and magnesium carbonate may be mixed to be used.

As the colorant, one of organic pigment, inorganic pigment, fluorescence pigment, metal pigment, pearl pigment, and phosphorescent pigment may be used, or two or more of them may be mixed to be used.

For example, Yellow 2GS (UKSEUNG CHEMICAL CO. LTD.) is used as the colorant.

A usage amount of the colorant is approximately 1 wt % to 10 wt %.

The body 10 has a bar-like shape having a circular sectional shape, and has a diameter ranging from 0.3 mm to 10 mm and a length ranging from 1 cm to 30 cm.

Figure 4:
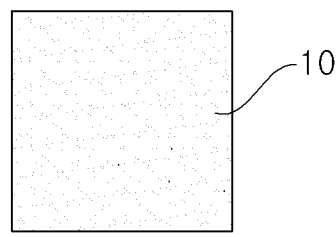
FIG. 4 is a cross-sectional view of a body having a quadrangular shape of the bar type clay member for craft according to an exemplary embodiment of the present invention.

As shown in FIG. 4, the body 10 may be formed to have a quadrangular sectional shape. Besides, the body 10 may be formed to have any other sectional shapes such as a triangular sectional shape, a pentagonal sectional shape, a hexagonal sectional shape, an octagonal sectional shape, and the like.

When the body 10 has a polygonal sectional shape, the thickness of the body 10 is set to have the diameter of a circumscribed circle ranging from 0.3 mm to 10 mm.

Although not shown on the drawings, the body 10 may have an oval sectional shape and, in this case, the thickness of the body 10 is set such that the length of a longer axis of the oval section is approximately 0.3 mm to 10 mm.

Figure 5:
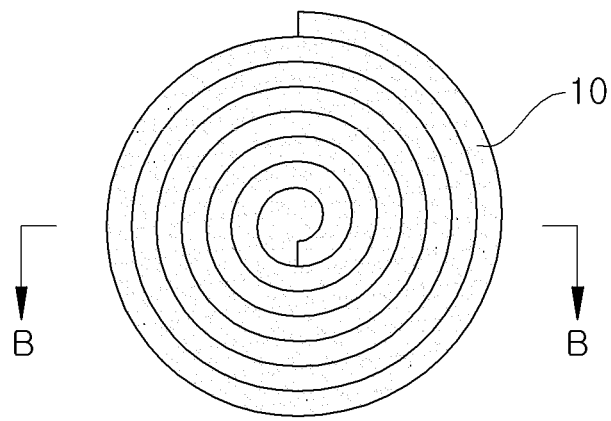
FIG. 5 is front view of the bar type clay member for craft according to another exemplary embodiment of the present invention.
Figure 6:
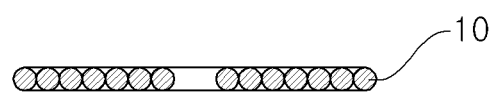
FIG. 6 is a cross-sectional view taken along line B-B in FIG. 5.

In another exemplary embodiment, as shown in FIGS. 5 and 6, the bar type clay member for craft may be wound in a spiral form so as to be provided.

When the bar type clay member for craft is wound in a spiral form and thusly provided, handling of the bar type clay member for craft, such as transportation, packaging, or the like, is facilitated, and also, the bar type clay member for craft can be unwound by a required amount so as to be conveniently used.

The present exemplary embodiment is the same as the former exemplary embodiment except for the foregoing configuration, so a detailed description thereof will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A clay bar for craft consisting of a body formed by heating and melting 50 wt % to 80 wt % of a wax, adding 10 wt % to 40 wt % of a body pigment and 1 wt % to 10 wt % of a colorant to melted wax, and then melting and dispersing the body pigment and colorant in the wax, the body having a thickness ranging from 0.3 mm to 10 mm and having a bar shape,
    wherein the wax consists of one or more selected from microwax and beeswax,
    wherein one of calcium carbonate, kaolin clay, talc, and magnesium carbonate is used as the body pigment, or two or more of them are mixed to be used, and one of organic pigment, inorganic pigment, fluorescence pigment, metal pigment, pearl pigment, and phosphorescent pigment is used as the colorant, or two or more of them are mixed to be used.

2. The clay bar of claim 1, wherein the body is formed to have one sectional shape among a circular shape, an oval shape, and a polygonal shape, and the thickness of the body is set as the diameter when the body has a circular sectional shape, the thickness of the body is set as the length of a longer axis when the body has an oval sectional shape, and the thickness of the body is set as the diameter of a circumscribed circle when the body has a polygonal sectional shape.

3. The clay bar of claim 1, wherein the body is wound in a spiral form and thusly provided.

\* \* \* \* \*